(12) United States Patent
Peng et al.

(10) Patent No.: US 12,217,042 B2
(45) Date of Patent: Feb. 4, 2025

(54) METHOD AND APPARATUS FOR PROCESSING UPGRADE PACKAGE OF VEHICLE

(71) Applicant: HUAWEI TECHNOLOGIES CO., LTD., Shenzhen (CN)

(72) Inventors: Jianfen Peng, Beijing (CN); Changjian Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 66 days.

(21) Appl. No.: 17/743,885

(22) Filed: May 13, 2022

(65) Prior Publication Data

US 2022/0276855 A1    Sep. 1, 2022

Related U.S. Application Data

(63) Continuation of application No. PCT/CN2020/097666, filed on Jun. 23, 2020.

(30) Foreign Application Priority Data

Nov. 14, 2019    (CN) .......................... 201911113667.1

(51) Int. Cl.
G06F 8/65    (2018.01)
(52) U.S. Cl.
CPC ...................................... *G06F 8/65* (2013.01)
(58) Field of Classification Search
CPC .......................................................... G06F 8/65
See application file for complete search history.

(56) References Cited

U.S. PATENT DOCUMENTS

| | | | | |
|---|---|---|---|---|
| 10,755,356 B1* | 8/2020 | LaBarre | ................. | G06Q 40/08 |
| 11,130,419 B2* | 9/2021 | Lin | .......... | H02J 50/90 |
| 11,228,884 B2* | 1/2022 | Clark | ..................... | H04W 4/021 |
| 2002/0010797 A1* | 1/2002 | Moulton | ................. | H04L 69/04 |
| | | | | 709/236 |
| 2004/0151182 A1* | 8/2004 | Kokubo | .............. | H04L 63/0485 |
| | | | | 370/470 |
| 2006/0294514 A1 | 12/2006 | Bauchot et al. | | |
| 2010/0179720 A1 | 7/2010 | Lin et al. | | |
| 2015/0082297 A1 | 3/2015 | Parry et al. | | |

(Continued)

FOREIGN PATENT DOCUMENTS

| | | |
|---|---|---|
| CN | 103475710 A | 12/2013 |
| CN | 105204887 A | 12/2015 |

(Continued)

*Primary Examiner* — Jae U Jeon
(74) *Attorney, Agent, or Firm* — Rimon PC (57) ABSTRACT

A method and an apparatus for processing a vehicle upgrade package. In the method, a first terminal receives a first data block from a server, where the first data block is used for upgrading the vehicle. The first terminal obtains a second data block from a second terminal, where the second data block is used for upgrading the vehicle. The second data block is sent by the server to the second terminal, and the first terminal obtains the vehicle upgrade package based on the first data block and the second data block. The terminals no longer need to obtain the complete vehicle upgrade package from an OTA server. Therefore, the load of the OTA server can be reduced.

17 Claims, 6 Drawing Sheets

(56) References Cited

U.S. PATENT DOCUMENTS

| | | | |
|---|---|---|---|
| 2015/0172413 A1* | 6/2015 | Yoneda | H04L 67/63 709/233 |
| 2015/0363210 A1 | 12/2015 | Wehrman et al. | |
| 2017/0274789 A1* | 9/2017 | Ma | B60L 53/37 |
| 2018/0285088 A1 | 10/2018 | Lancioni et al. | |
| 2019/0258466 A1* | 8/2019 | Mitchell | H04L 67/34 |
| 2019/0265965 A1 | 8/2019 | Acharya et al. | |
| 2019/0294135 A1 | 9/2019 | Madrid et al. | |
| 2019/0391800 A1* | 12/2019 | Lin | H04L 67/34 |
| 2020/0089487 A1* | 3/2020 | Ramic | G06F 8/65 |
| 2020/0311274 A1* | 10/2020 | Cooke | G06F 8/65 |
| 2021/0067829 A1* | 3/2021 | Park | H04L 9/0656 |

FOREIGN PATENT DOCUMENTS

| | | |
|---|---|---|
| CN | 107809471 A | 3/2018 |
| CN | 107979815 A | 5/2018 |
| CN | 108449735 A | 8/2018 |
| JP | 2004274415 A | 9/2004 |
| JP | 2010191497 A | 9/2010 |
| JP | 2017531358 A | 10/2017 |
| KR | 20040040381 A | 5/2004 |
| KR | 20150072809 A | 6/2015 |
| KR | 20170022062 A | 3/2017 |
| WO | 2018070242 A1 | 4/2018 |
| WO | 2019149599 A1 | 8/2019 |

\* cited by examiner

METHOD AND APPARATUS FOR PROCESSING UPGRADE PACKAGE OF VEHICLE

CROSS-REFERENCE TO RELATED APPLICATIONS

This application is a continuation of International Application No. PCT/CN2020/097666, filed on Jun. 23, 2020, which claims priority to Chinese Patent Application No. 201911113667.1, filed on Nov. 14, 2019. The disclosures of the aforementioned applications are hereby incorporated by reference in their entireties

TECHNICAL FIELD

This application relates to communications technologies, and in particular, to a method and an apparatus for processing a vehicle upgrade package.

BACKGROUND

With the development of Internet of vehicles technologies, an increasing quantity of vehicles are provided with software-related operating systems. During a software upgrade, a vehicle may download a vehicle upgrade package from an over the air (OTA) server based on an OTA technology, and implement software upgrade by using the vehicle upgrade package.

Usually, whenever a vehicle sends an upgrade request, the OTA server needs to respond to the upgrade request of the vehicle and deliver a vehicle upgrade package to the vehicle.

However, because the OTA server needs to provide a vehicle upgrade package for each vehicle, the load of the OTA server is relatively heavy.

SUMMARY

Embodiments of this application provide a method and an apparatus for processing a vehicle upgrade package, to reduce the load of an OTA server.

According to a first aspect, an embodiment of this application provides a method for processing a vehicle upgrade package. The method includes: A first terminal receives one or more first data blocks from a server, where the first data block is used for vehicle upgrading; the first terminal obtains one or more second data blocks from a second terminal, where the second data block is used for upgrading an in-vehicle system, and the second data block is sent by the server to the second terminal; and the first terminal obtains the vehicle upgrade package based on the first data block and the second data block. To be specific, the server may divide the vehicle upgrade package into a plurality of data blocks, and then deliver the plurality of data blocks to a plurality of terminals. Then, each terminal may obtain the vehicle upgrade package in a peer-to-peer (P2P) manner based on the data block that has been received by the terminal and the data blocks obtained by the terminal from the other terminals. In this process, none of the terminals need to obtain the complete vehicle upgrade package from the OTA server. Therefore, the load of the OTA server can be reduced.

In a possible design, both the first data block and the second data block are encrypted data blocks, and the data block length of the first data block and the data block length of the at least one second data block are each an integer multiple of the packet length of an encryption algorithm. By dividing the vehicle upgrade package into data blocks whose lengths are integer multiples of the packet length, it can be ensured that the decapsulator does not consume additional time for packet integration in decryption during the processing of the encrypted packets. This effectively resists any timing attack, thereby ensuring confidentiality protection and integrity protection of the encrypted packets.

In a possible design, that the first terminal obtains a vehicle upgrade package based on the first data block and the at least one second data block includes: The first terminal starts to decrypt the first data block at a first time, and the first terminal receives the second data block at a second time, where the first time is earlier than the second time; or the first terminal starts to decrypt the second data block at a third time, and the first terminal receives the first data block at a fourth time, where the third time is earlier than the fourth time. In some embodiments of this application, the first terminal decrypts a data block while receiving the data block. Therefore, compared with a method in which the first terminal decrypts all the data blocks together after receiving all the data blocks, the method in some embodiments of this application can improve decryption efficiency and reduce the time of downloading an upgrade package.

In a possible design, the first data block and the second data block each include a signature of a server that generates an upgrade package for upgrading a vehicle system; and that the first terminal starts to decrypt the first data block at a first time includes: The first terminal starts to decrypt the first data block at the first time when the first terminal confirms that a signature in the first data block is the signature of the server that generates the upgrade package for upgrading the vehicle system; and that the first terminal starts to decrypt the second data block at a third time includes: The first terminal starts to decrypt the second data block at the third time when the first terminal confirms that a signature in the second data block is the signature of the server that generates the upgrade package for upgrading the vehicle system. In this case, if the signatures carried in the first data block and the second data block are not the signature of the OTA server, the first data block and the second data block may be discarded, and a first data block and a second data block that include the signature of the OTA server may be re-obtained. In this way, the first terminal is prevented from receiving an insecure data block sent by another device, thereby improving the security of data block transmission.

In a possible design, the server stores an association relationship between a data block obtained through the division of the vehicle upgrade package and the terminal that receives the data block. That the first terminal obtains one or more second data blocks from a second terminal includes: The first terminal sends a data block obtaining request to the second terminal based on the association relationship; and the first terminal receives the one or more second data blocks returned by the second terminal in response to the data block obtaining request. In this way, the first terminal can accurately obtain the second data block from the corresponding second terminal based on the association relationship provided by the server.

In a possible design, the server is a proxy server, the vehicle upgrade package is obtained by the proxy server from an over the air (OTA) server, and the first terminal is a vehicle. In this case, the proxy server can assist the vehicle in upgrading, thereby reducing the load of the OTA server.

In a possible design, the first terminal is a charging pile.

In a possible design, the method further includes: The charging pile receives an upgrade package obtaining request sent by a vehicle; and when the vehicle succeeds in safety verification of the charging pile, the charging pile returns the vehicle upgrade package to the vehicle based on the upgrade package obtaining request. In this way, the vehicle can download the vehicle upgrade package while being charged. It can be understood that, during the charging of the vehicle, there may usually be a relatively good network environment because the vehicle is usually in a stationary state; and incidents such as download interruption of the vehicle upgrade package due to insufficient power of the vehicle can be avoided because the vehicle is connected to a charging auxiliary device. Therefore, user experience of vehicle upgrading can be effectively improved.

In a possible design, that a first terminal receives a first data block from a server includes: The first terminal receives the first data block from the server when the first terminal succeeds in security authentication with the server. The first terminal receives the first data block after performing security authentication with the server, so that security of the first data block received by the first terminal can be improved.

According to a second aspect, an embodiment of this application provides a method for processing a vehicle upgrade package. The method includes: A server divides the vehicle upgrade package into a plurality of data blocks; and the server distributes the plurality of data blocks to at least one terminal, where each terminal is configured to obtain the vehicle upgrade package based on a data block received by the terminal and a data block from another terminal in the at least one terminal.

In a possible design, that a server divides a vehicle upgrade package into a plurality of data blocks includes: The server encrypts the vehicle upgrade package according to an encryption algorithm, and divides the encrypted vehicle upgrade package into the plurality of data blocks.

In a possible design, the server is a proxy server; and before the server divides the vehicle upgrade package into the blocks, the method further includes: The proxy server obtains the vehicle upgrade package from an over the air (OTA) server.

In a possible design, that the proxy server obtains the vehicle upgrade package from an over the air (OTA) server includes: The proxy server sends a vehicle upgrade package obtaining request to the over the air (OTA) server, where the vehicle upgrade package obtaining request includes an operating system type and a version of a vehicle; and when the proxy server succeeds in security verification with the OTA server, the proxy server receives the vehicle upgrade package sent by the OTA server, where the vehicle upgrade package is generated by the OTA server based on the operating system type and the version of the vehicle.

In a possible design, after the server distributes the plurality of data blocks to the at least one terminal, the method further includes: The server records an association relationship between each data block obtained through division of the vehicle upgrade package and the terminal that receives the data block.

According to a third aspect, an embodiment of this application provides a first terminal, including: a receiving module, configured to receive one or more first data blocks from a server, where the first data block is used for vehicle upgrading; and a processing module, configured to: obtain, by the first terminal, one or more second data blocks from a second terminal, where the second data block is used for upgrading an in-vehicle system, and the second data block is sent by the server to the second terminal; and obtain a vehicle upgrade package based on the first data block and the second data block.

In a possible design, both the first data block and the second data block are encrypted data blocks, and the data block length of the first data block and the data block length of the at least one second data block each are an integer multiple of the packet length of an encryption algorithm.

In a possible design, the processing module is configured to: start to decrypt the first data block at a first time and receive the second data block at a second time, where the first time is earlier than the second time; or start to decrypt the second data block at a third time and receive the first data block at a fourth time, where the third time is earlier than the fourth time.

In a possible design, the first data block and the second data block each include a signature of a server that generates an upgrade package for upgrading a vehicle system; and the processing module is further configured to: start to decrypt the first data block at the first time when confirming that a signature in the first data block is the signature of the server that generates the upgrade package for upgrading the vehicle system; and start to decrypt the second data block at the third time when confirming that a signature in the second data block is the signature of the server that generates the upgrade package for upgrading the vehicle system.

In a possible design, the server stores an association relationship between each data block obtained through division of the vehicle upgrade package and the terminal that receives the data block; and the processing module is further configured to: send a data block obtaining request to the second terminal based on the association relationship; and receive the one or more second data blocks returned by the second terminal in response to the data block obtaining request.

In a possible design, the server is a proxy server, the vehicle upgrade package is obtained by the proxy server from an over the air (OTA) server, and the first terminal is a vehicle.

In a possible design, the first terminal is a charging pile.

In a possible design, the receiving module is further configured to receive an upgrade package obtaining request sent by a vehicle; and the processing module is further configured to: when the vehicle succeeds in safety verification of the charging pile, return the vehicle upgrade package to the vehicle based on the upgrade package obtaining request.

In a possible design, the receiving module is configured to receive, by the first terminal, the first data block from the server when the first terminal succeeds in security authentication with the server.

According to a fourth aspect, an embodiment of this application provides a server, including: a processing module, configured to divide a vehicle upgrade package into a plurality of data blocks; and a sending module, configured to distribute the plurality of data blocks to at least one terminal, where each terminal is configured to obtain the vehicle upgrade package based on a data block received by the terminal and a data block from another terminal in the at least one terminal.

In a possible design, the processing module is configured to: encrypt the vehicle upgrade package according to an encryption algorithm, and divide the encrypted vehicle upgrade package into the plurality of data blocks.

In a possible design, the server is a proxy server; and the processing module is further configured to obtain the vehicle upgrade package from an over the air (OTA) server.

In a possible design, the processing module is configured to: send a vehicle upgrade package obtaining request to the over the air (OTA) server, where the vehicle upgrade package obtaining request includes an operating system type and a version of a vehicle; and when the proxy server succeeds in security verification with the OTA server, receive the vehicle upgrade package sent by the OTA server, where the vehicle upgrade package is generated by the OTA server based on the operating system type and the version of the vehicle.

In a possible design, the processing module is further configured to record an association relationship between each data block obtained through division of the vehicle upgrade package and the terminal that receives the data block.

According to a fifth aspect, an embodiment of this application provides an apparatus for processing a vehicle upgrade package. The apparatus for processing a vehicle upgrade package may be a chip or a system on a chip in a first terminal, and includes a processor and an interface circuit. The interface circuit is configured to receive code instructions and transmit the code instructions to the processor. The processor is configured to run the code instructions to perform the method according to any one of the first aspect or the possible designs of the first aspect.

According to a sixth aspect, an embodiment of this application provides an apparatus for processing a vehicle upgrade package. The apparatus for processing a vehicle upgrade package may be a chip or a system on a chip in a server, and includes a processor and an interface circuit. The interface circuit is configured to receive code instructions and transmit the code instructions to the processor. The processor is configured to run the code instructions to perform the method according to any one of the second aspect or the possible designs of the second aspect.

According to a seventh aspect, an embodiment of this application provides an apparatus for processing a vehicle upgrade package, including a memory and a processor. The processor executes program instructions in the memory to implement the method according to any one of the first aspect or the possible designs of the first aspect.

According to an eighth aspect, an embodiment of this application provides an apparatus for processing a vehicle upgrade package, including a memory and a processor. The processor executes program instructions in the memory to implement the method according to any one of the second aspect or the possible designs of the second aspect.

According to a ninth aspect, an embodiment of this application provides a readable computer storage medium. The readable computer storage medium is configured to store a computer program, and the computer program is used to implement the method according to any one of the first aspect or the possible designs of the first aspect.

According to a tenth aspect, an embodiment of this application provides a readable computer storage medium. The readable computer storage medium is configured to store a computer program, and the computer program is used to implement the method according to any one of the second aspect or the possible designs of the second aspect.

According to an eleventh aspect, an embodiment of this application provides a system for processing a vehicle upgrade package. The system includes the communications apparatus in the third aspect and the corresponding feasible implementations and the communications apparatus in the fourth aspect and the corresponding feasible implementations.

It should be understood that, the technical solutions of the second aspect to the eleventh aspect of this application correspond to the technical solution of the first aspect of this application, and beneficial effects obtained by each aspect and corresponding feasible implementations are similar and are not described in detail again.

DESCRIPTION OF EMBODIMENTS

The following describes implementations of embodiments in detail with reference to accompanying drawings.

Figure 1:
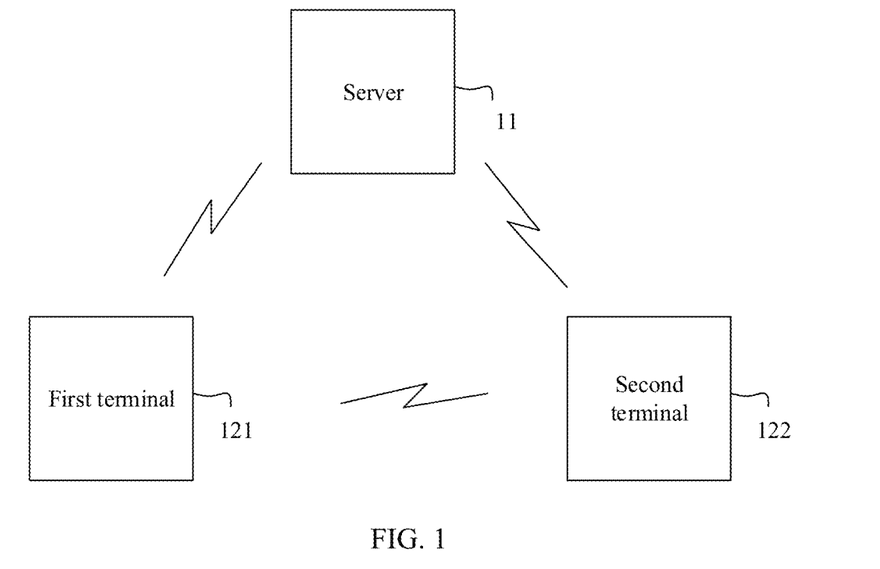
FIG. 1 is a schematic diagram of a network system to which a method for processing a vehicle upgrade package is applied according to an embodiment of this application.

A method for processing a vehicle upgrade package provided in embodiments of this application may be applied to a network system in FIG. 1. The system may include a server 11, a first terminal 121, and a second terminal 122. There may be one or more second terminals 122.

The server 11 may be an OTA server configured to deliver a vehicle upgrade package, or may be a vehicle fleet server that has obtained a vehicle upgrade package from an OTA server, or any other possible server. This is not specifically limited in embodiments of this application. The first terminal 121 may be a vehicle in any form, the first terminal 121 may be a vehicle auxiliary device (for example, a vehicle charging pile) in any form, or the first terminal 121 may be a mobile terminal (for example, a mobile phone, a tablet computer, or a wearable device). This is not specifically limited in embodiments of this application. The second terminal 122 may be a vehicle in any form, the second terminal 122 may be a vehicle auxiliary device (for example, a vehicle charging pile) in any form, or the second terminal 122 may be a mobile terminal (for example, a mobile phone, a tablet computer, or a wearable device). This is not specifically limited in embodiments of this application. The first terminal 121 and the second terminal 122 may be devices of a same type. For example, both the first terminal 121 and the second terminal 122 are vehicles, vehicle auxiliary devices, mobile terminals, or the like. Alternatively, the first terminal 121 and the second terminal 122 may be devices of different types. For example, the first terminal 121 is a vehicle, and the second terminal 122 is a vehicle auxiliary device, a mobile terminal, or the like. This is not specifically limited in embodiments of this application. Manners of processing a vehicle upgrade package when the server 11, the first terminal 121, and the second terminal 122 are various specific devices are described in detail in subsequent embodiments. Details are not described herein.

The first terminal 121 and the second terminal 122 each establish a communication connection to the server 11. For example, the first terminal 121 and the second terminal 122 each may establish a communication connection to the server 11 by using a protocol such as the hypertext transfer protocol (HTTP) or the hypertext transfer protocol over secure socket layer (HTTPS). This is not limited in embodiments of this application.

P2P communication may be implemented between the first terminal 121 and the second terminal 122 through a communication connection in any form. For example, P2P communication may be implemented between the first terminal 121 and the second terminal 122 through wireless transmission, for example, Bluetooth transmission, carrierless communication (ultra-wide band (UWB)), or infrared transmission.

Alternatively, P2P communication may be implemented between the first terminal 121 and the second terminal 122 through wired transmission. This is not specifically limited in embodiments of this application.

Alternatively, P2P communication may be implemented between the first terminal 121 and the second terminal 122 based on an index server. The index server may be the server 11 or may be any other server. For example, the index server may store a resource list. The resource list includes an association relationship between the first terminal 121 and a resource identifier in the first terminal 121, and an association relationship between the second terminal 122 and a resource identifier in the second terminal 122. When the first terminal 121 expects to obtain a resource, the first terminal 121 obtains a resource list of each terminal from the index server, and determines, from the resource lists, that a terminal including an identifier of the resource is the second terminal 122. In this case, the first terminal 121 may further obtain the resource from the second terminal 122 through wired communication or wireless communication.

Figure 2:
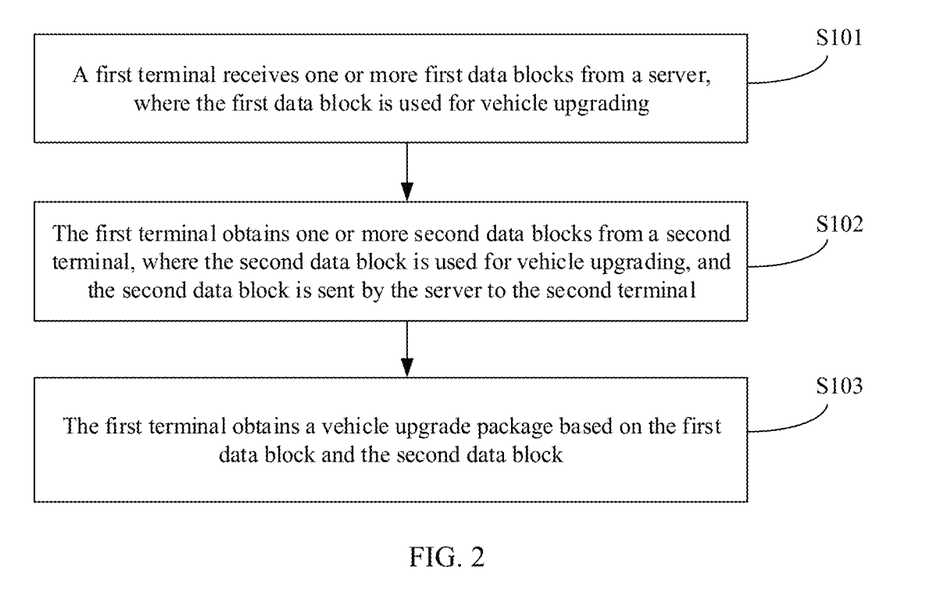
FIG. 2 is a schematic flowchart of a method for processing a vehicle upgrade package according to an embodiment of this application.

FIG. 2 is a schematic flowchart of a method for processing a vehicle upgrade package according to an embodiment of this application. As shown in FIG. 2, the method includes the following steps.

Step S101: A first terminal receives one or more first data blocks from a server, where the first data block is used for vehicle upgrading.

In some embodiments of this application, the server may be an OTA server or may be a server other than an OTA server. When the server is an OTA server, the server may generate an upgrade package for vehicle upgrading. When the server is a server other than an OTA server, the server may first obtain an upgrade package for vehicle upgrading from an OTA server.

The server may divide a complete upgrade package for vehicle upgrading into a plurality of data blocks. It can be understood that, based on a device specifically corresponding to an upgrade package, each upgrade package may correspond to a device number and an upgrade package sequence number. During block division, the server may identify the data blocks based on locations of the data blocks in the upgrade package, or the like, so that the data blocks may be subsequently integrated based on identifiers of the plurality of data blocks to obtain the complete upgrade package again. A specific identification manner and identification content of the data blocks are not specifically limited in this application. In an embodiment, a data block may be a complete data packet.

For example, in a specific implementation, a header of each data block obtained through block division may include one or more of a version number, an upgrade package sequence number i, a device number j, and a sequence number k of the data block in an upgrade package i. For example, currently, there are approximately 25 to 100 types of automobile electronic control units (ECU) for passenger vehicles. Therefore, there are usually no more than 256 types of upgrade packages. Correspondingly, a total quantity of upgrade package sequence numbers i does not exceed 256. It may be specified that the upgrade package sequence number i occupies one byte in the data block. Correspondingly, there are also usually no more than 256 types of vehicles. Therefore, the device number (for example, an ECU number of a vehicle) j may also occupy one byte. The sequence number k of the data block in the upgrade package i is related to a size of the upgrade package and an upgrading manner. For example, a larger upgrade package indicates a larger sequence number k; or k is smaller when a differential upgrading manner is used or k is larger when a complete package upgrading manner is used. For example, k may occupy 1 to 3 bytes. This is not specifically limited in this application.

After obtaining the plurality of data blocks, the server may distribute the plurality of data blocks to a plurality of terminals. In some embodiments of this application, a description is provided by using an example in which the first terminal in the plurality of terminals is used as an execution body and a terminal in the plurality of terminals other than the first terminal is a second terminal. The first terminal and the second terminal may alternatively be terminals other than the plurality of terminals. A data block received by the first terminal is a first data block, and there may be one or more first data blocks. A data block received by the second terminal is a second data block, and there may be one or more second data blocks. All first data blocks and all second data blocks may form the complete upgrade package. Certainly, there may be a case, for example, redundant information-related encapsulation is performed; and the complete upgrade package may be formed when some data packets are parsed. Alternatively, the first data block herein may be one type of data block, and the second data block is another type of data block. Transmission paths of different types of data blocks may be different. For example, different types of data blocks reach a destination end after passing through different devices.

Optionally, in a specific implementation, the first terminal may send an upgrade request to the server. The upgrade request may include basic information of the first terminal, and the basic information may include software information and/or hardware information or a vehicle model (for example, a unique identifier (vehicle identification number (VIN)) of a vehicle). In response to the upgrade request, the server may send, to the first terminal, one or more first data blocks that match the basic information in the upgrade request. Before sending the upgrade request, the first terminal may further receive an upgrade notification. There may be various conditions for triggering sending of the upgrade request. For example, sending of the upgrade request is triggered based on a timing moment specified in the first terminal; sending of the upgrade request is triggered when a user taps an upgrade control on a screen of an in-vehicle infotainment (IVI) system in the first terminal; sending of the upgrade request is triggered by using an application in a mobile device such as a mobile phone that communicates with the first terminal; or the upgrade request is automatically sent when a network environment of the first terminal satisfies an upgrade requirement (which is also referred to as silent upgrading).

Optionally, before step S101 is performed, bidirectional authentication may be performed between the first terminal and the server to establish secure communication. For example, bidirectional authentication may be performed between the first terminal and the server by using public key infrastructure (PKI). For example, the first terminal may check a digital certificate of the server in the PKI to implement authentication on the server by the first terminal; and the server may check a digital certificate of the first terminal in the PKI to implement authentication on the first terminal by the server. It can be understood that, bidirectional authentication may alternatively be performed between the first terminal and the server in another manner based on an actual application scenario. This is not specifically limited in this application.

Step S102: The first terminal obtains one or more second data blocks from the second terminal, where the second data block is used for vehicle upgrading, and the second data block is sent by the server to the second terminal.

In some embodiments of this application, the first terminal may obtain the one or more second data blocks from the second terminal in any P2P manner described above. There may be one or more second terminals. A quantity of second terminals is not limited in this application. For example, when there is one second terminal, the first terminal obtains one or more second data blocks from one second terminal. When there are a plurality of second terminals, the first terminal obtains one or more second data blocks from one or more second terminals.

It should be noted that, in some embodiments of this application, a sequence between step S102 and step S101 may be reversed. To be specific, the first terminal may first obtain the one or more first data blocks, and then obtain the one or more second data blocks; or the first terminal may first obtain the one or more second data blocks, and then obtain the one or more first data blocks. This is not specifically limited in this application.

Optionally, when the server distributes the data blocks to the plurality of terminals, the server stores an association relationship between each data block and the terminal that receives the data block. A specific implementation of step S102 may be as follows: The first terminal sends a data block obtaining request to the second terminal based on the association relationship, and the first terminal receives at least one second data block returned by the second terminal in response to the data block obtaining request.

In some embodiments of this application, each data block may uniquely correspond to one data block identifier, and the data block identifier may be an identifier such as a number or a name. Each terminal may uniquely correspond to one terminal identifier, and the terminal identifier may be an identifier such as a device serial number of a terminal or a communication address of a terminal. Certainly, for different terminals, specific forms of terminal identifiers used by the terminals may be different. For different data blocks, data block identifiers used by the data blocks may be different. For each data block, the server may store an association relationship between an identifier of the data block and an identifier of the terminal that receives the data block. In this case, the first terminal may determine, based on the association relationship, a data block (for example, one or more first data blocks) that has been received by the first terminal, a data block (for example, one or more second data blocks) that is still missing for the first terminal, and an identifier of a second terminal associated with the data block that is missing for the first terminal. Further, the first terminal may send a data obtaining request to the second terminal based on the identifier of the second terminal, and receive one or more second data blocks returned by the second terminal. For example, when there are a plurality of second terminals, the first terminal may send a data block obtaining request to each second terminal based on the association relationship, and receive one or more second data blocks returned by the second terminal. The server may alternatively use a simple technical verification manner or another verification manner to ensure that no data block is missing or ensure that the data blocks can satisfy a normal upgrading condition.

Optionally, before step S102 is performed, bidirectional authentication may be performed between the first terminal and the second terminal to establish secure communication. For example, bidirectional authentication may be performed between the first terminal and the second terminal by using PKI. For example, the first terminal may check a digital certificate of the second terminal in the PKI to implement authentication on the second terminal by the first terminal, and the second terminal may check a digital certificate of the first terminal in the PKI to implement authentication on the first terminal by the second terminal. It can be understood that, bidirectional authentication may alternatively be performed between the first terminal and the second terminal in another manner based on an actual application scenario. This is not specifically limited in this application.

Step S103: The first terminal obtains a vehicle upgrade package based on the first data block and the second data block.

In some embodiments of this application, after obtaining all the second data blocks, the first terminal may integrate the first data block and the second data block according to a data block arrangement sequence or the like based on an identifier of the second data block and an identifier of the first data block, to obtain the vehicle upgrade package.

In some embodiments of this application, the vehicle upgrade package may be an upgrade package for upgrading a system (or software) of a single component in a vehicle, or may be an upgrade package for upgrading a system (or software) of a plurality of components or all components in a vehicle. This is not specifically limited in this application.

In conclusion, in some embodiments of this application, the server may divide the vehicle upgrade packet into the plurality of data blocks, and then deliver the plurality of data blocks to the plurality of terminals. Then, a terminal may obtain a data block from another terminal in a P2P manner, and obtain the vehicle upgrade package based on the data block that has been received by the terminal and a data block obtained by the terminal from another terminal. In this process, none of the terminals need to obtain the complete vehicle upgrade package from an OTA server. Therefore, the load of the OTA server can be reduced.

Optionally, both the first data block and the second data block may be encrypted data blocks.

In some embodiments of this application, when dividing the vehicle upgrade package into blocks, the server may first encrypt the vehicle upgrade package, and then divide the encrypted vehicle upgrade package into an encrypted first data block and an encrypted second data block. Alternatively, when dividing the vehicle upgrade package into blocks, the server may first divide the vehicle upgrade package into one or more first data blocks and one or more second data blocks, and then encrypt each first data block and each second data block. A specific implementation of encryption is not specifically limited in this application. To ensure data block integrity, the first data block and the second data block may be respectively stored in terminals, or may be centrally stored in a terminal, for example, the first terminal and/or the second terminal. Alternatively, information included in the first data block and the second data block may be respectively stored in terminals, or may be centrally stored in a terminal, for example, the first terminal and/or the second terminal.

In some embodiments of this application, an encryption algorithm used by the server to obtain an encrypted data block may be a symmetric encryption algorithm, or may be an asymmetric encryption algorithm or any other encryption algorithm. The encryption algorithm is not specifically limited in this application. It can be understood that, for data blocks obtained through encryption by using different encryption methods, identifiers of the encryption algorithms may be carried in the data blocks. During decryption, a corresponding decryption algorithm may be used based on an identifier of the encryption algorithm. This is not specifically limited in this application.

In some embodiments of this application, by encrypting the first data block and the second data block, an unauthorized user can be prevented from obtaining the upgrade packet, and confidentiality of a transmission process of data blocks obtained through division can be ensured. This can further ensure transmission security of an OTA data packet while ensuring fast transmission of the OTA upgrade packet.

In an optional implementation of this embodiment of this application, the data block length of the first data block and the data block length of the at least one second data block each are an integer multiple of the packet length of a symmetric encryption algorithm.

In some embodiments of this application, a length of the vehicle upgrade packet input to the symmetric encryption algorithm may be an integer multiple of the packet length of the encryption algorithm. For example, the packet length may be 8 bytes, 16 bytes, or 128 bytes. However, the length of the vehicle upgrade packet is usually random, and may not be an integer multiple of the packet length. Therefore, a padding part may be added to the vehicle upgrade package to make a total length of the vehicle upgrade package become an integer multiple of the packet length. Further, the vehicle upgrade package is divided into a plurality of data blocks whose lengths are integer multiples of the packet length of the encryption algorithm. For example, when the packet length is 128 bytes, lengths of both the first data block and the second data block may be 128*n, where n is a natural number.

In some embodiments of this application, by dividing the vehicle upgrade packet into data blocks whose lengths are integer multiples of the packet length, it can be ensured that a decapsulator does not additionally consume a time for packet integration in decryption during processing of encrypted packets. This effectively resists a timing attack, thereby ensuring confidentiality protection and integrity protection of the encrypted packets.

In an optional implementation, when the first terminal is connected to an OTA server, the first terminal may obtain, from the OTA server, packet lengths of the first data block and the second data block, a key for encrypting a data block, and a valid time of the key. In this case, the first terminal may decrypt the first data block and the second data block within the valid time of the key based on the key.

Optionally, when the data block length of the first data block and the data block length of the at least one second data block each are an integer multiple of the packet length of an encryption algorithm, a manner of decrypting the first data block and the second data block by the first terminal may be as follows:

Each time the first terminal receives a data block (including the first data block or the second data block), the first terminal immediately decrypts the received data block. In this case, when the first terminal receives the last data block, the first terminal may have completed decryption of a previously received data block. Therefore, the first terminal only needs to wait for a time for decrypting the last data block to complete decryption of all data blocks. In other words, in some embodiments of this application, the first terminal decrypts a data block while receiving the data block. Therefore, compared with a method in which the first terminal decrypts all the data blocks together after receiving all the data blocks, the method in some embodiments of this application can improve decryption efficiency and reduce the time of downloading an upgrade package.

It can be understood that, the first terminal may alternatively decrypt all the data blocks (including the first data block or the second data block) together after receiving all the data blocks. This is not specifically limited in this application.

Optionally, the first data block and the second data block each include a signature of a server that generates an upgrade package for upgrading a vehicle system. For example, before performing block division on the complete upgrade package for upgrading a vehicle system, the OTA server may sign the upgrade package, or digitally sign content of the upgrade package based on public key cryptography. A signature may be an identifier corresponding to the OTA server. For example, the signature may be a device identifier of the OTA server or an identifier of an operator operating the OTA server. Alternatively, the signature may include an identifier of a vehicle provider or the like. In addition, during block division, signatures are added to the first data block and the second data block. In this way, when obtaining the first data block and the second data block, the first terminal can determine, based on the signatures carried in the first data block and the second data block, whether the first data block and the second data block are sent by an OTA server allowed by the first terminal. It can be understood that, if the signatures carried in the first data block and the second data block are not the signature of the OTA server, the first data block and the second data block may be discarded, and a first data block and a second data block that include the signature of the OTA server may be re-obtained. In this way, the first terminal is prevented from receiving an insecure data block sent by another device, thereby improving security of data block transmission.

Correspondingly, the first data block and the second data block each include a signature of a server that generates an upgrade package for vehicle upgrading. The first terminal starts to decrypt the first data block at a first time when the first terminal confirms that a signature in the first data block is a signature of a server for downloading a vehicle upgrade package, and receives the second data block at a second time, where the first time is earlier than the second time; or the first terminal starts to decrypt the second data block at a third time when the first terminal confirms that a signature in the second data block is a signature of a server for downloading a vehicle upgrade package, and receives the first data block at a fourth time, where the third time is earlier than the fourth time.

Figure 3:
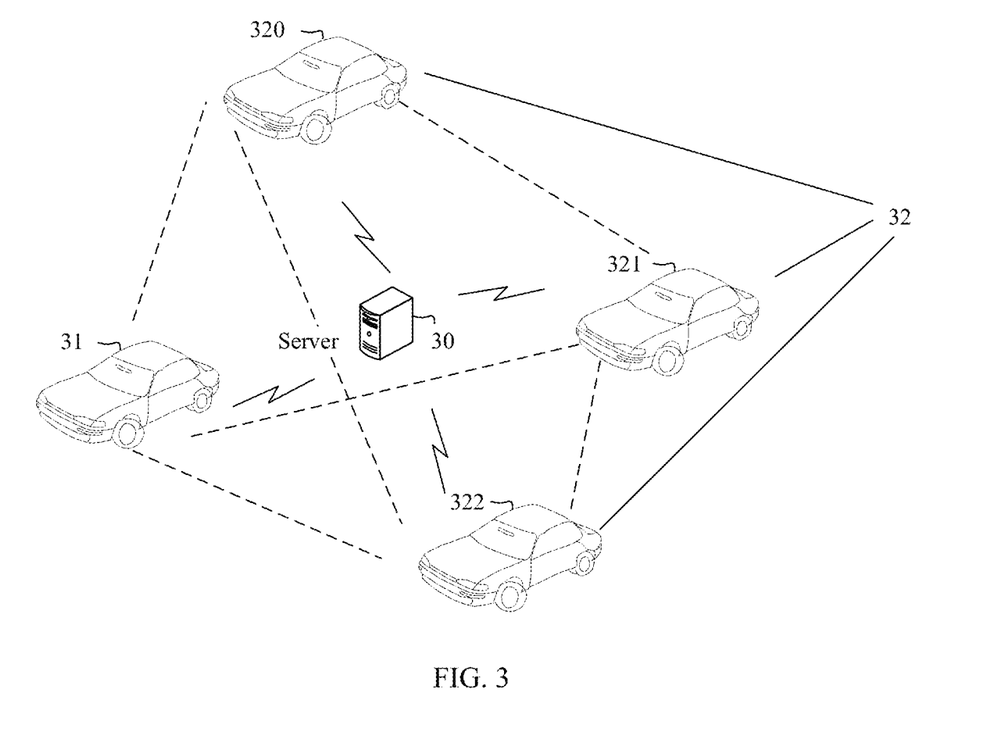
FIG. 3 is a schematic diagram of another network system to which a method for processing a vehicle upgrade package is applied according to an embodiment of this application.

For example, FIG. 3 shows a specific upgrading system to which a method for processing a vehicle upgrade package may be applied according to an embodiment of this application. As shown in FIG. 3, the upgrading system includes a server 30, a first terminal 31, and a second terminal 32. There are three second terminals 32, which are respectively numbered as a second terminal 320, a second terminal 321, and a second terminal 322.

In some embodiments of this application, the server 30 may be an OTA server. The server 30 may alternatively be a proxy server. For example, the proxy server may be a server that serves a vehicle fleet. When the server 30 is a proxy server, the proxy server may first establish secure communication with an OTA server through bidirectional authentication, and then the proxy server sends hardware and software information of a vehicle to the OTA server. After generating a vehicle upgrade package, the OTA server may deliver the vehicle upgrade package to the proxy server. It can be understood that, the OTA server may alternatively divide the vehicle upgrade package into blocks and deliver the blocks to a plurality of proxy servers; and the plurality of proxy servers obtain the vehicle upgrade package in the foregoing P2P manner. This is not specifically limited in this application.

Figure 4:
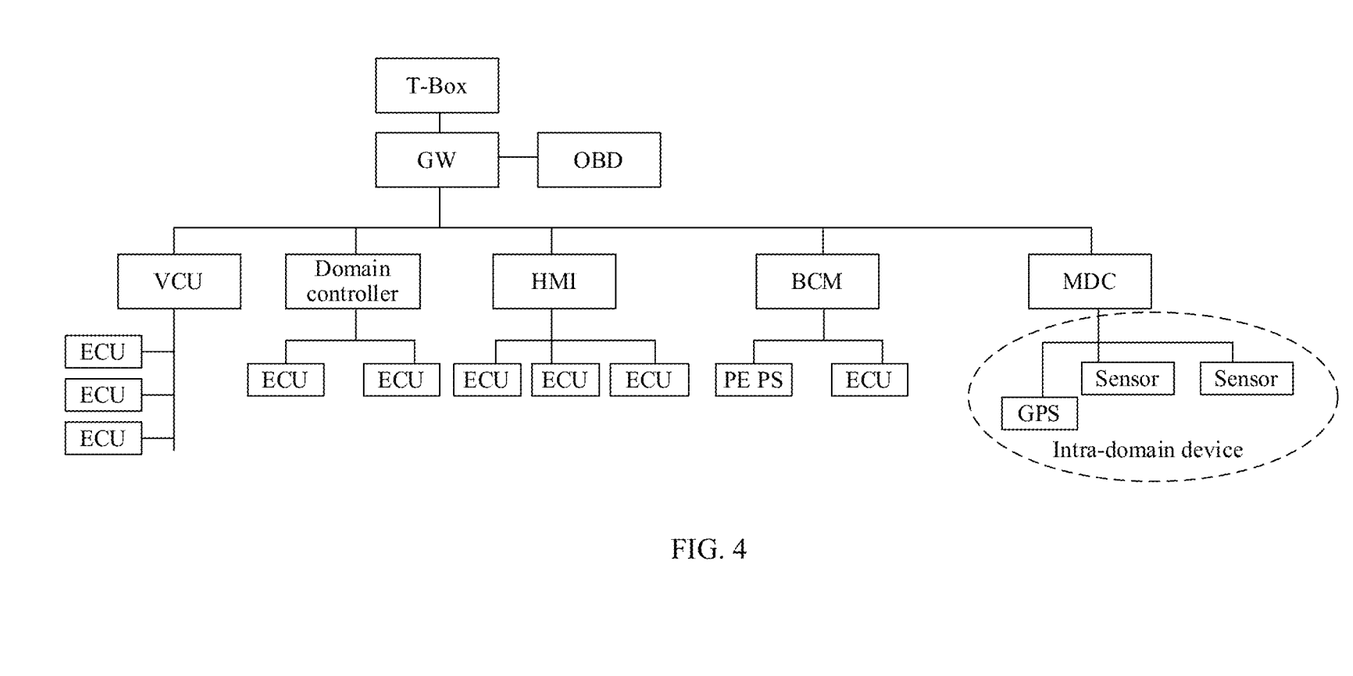
FIG. 4 is a schematic diagram of a logical framework of a vehicle-mounted device in a vehicle according to an embodiment of this application.

In some embodiments of this application, both the first terminal and the second terminal may be vehicles. FIG. 4 is a schematic diagram of a logical framework of a vehicle-mounted device in a vehicle. It can be understood that, the vehicle-mounted device in FIG. 4 may be all or some of vehicle-mounted devices included in the vehicle. These vehicle-mounted devices may be grouped into several domains, each domain includes one or more vehicle-mounted devices, each domain includes a domain administrator, and the domain administrator may also be referred to as a domain controller. For example, a mobile data center (MDC), one or more sensors, and a global positioning system (GPS) belong to a domain, and the MDC is a domain controller in the domain. A vehicle control unit (VCU), one or more electronic control units (ECU), a wireless power transmission (WPT) device, and the like belong to a domain, and the VCU is a domain controller in the domain. A human machine interface (HMI) and one or more ECUs belong to a domain, and the HMI is a domain controller in the domain. A body control module (BCM), one or more ECUs, a passive entry passive start (PEPS), and the like belong to a domain, and the BCM is a domain controller in the domain. The domain controller is connected to a gateway (GW), and the gateway is connected to an on-board diagnostics (OBD) system, a vehicle communications terminal (telematics box, T-Box) in the Internet of vehicles, and another device. For example, the domain controller may communicate with a device such as the T-Box through the gateway, and an intra-domain device may communicate with a device such as the gateway through the domain controller.

In an optional implementation, the vehicle downloads a vehicle upgrade package by using a T-Box, and determines a source of the vehicle upgrade package; and after determining that the vehicle upgrade package is delivered by an OTA server, the vehicle may forward the vehicle upgrade package to a corresponding vehicle-mounted device in the vehicle based on a device number corresponding to the upgrade package. A vehicle-mounted device (for example, an MDC or an HMI) with relatively strong computing and storage capabilities can perform packaging itself, so that consumption of a storage resource of the T-Box can be reduced. After performing packaging, a vehicle-mounted component in the vehicle may further perform signature verification on the upgrade package, and perform an operation such as upgrade installation after determining that the vehicle upgrade package is delivered by the OTA server. This can improve reliability of the upgrade package.

Figure 5:
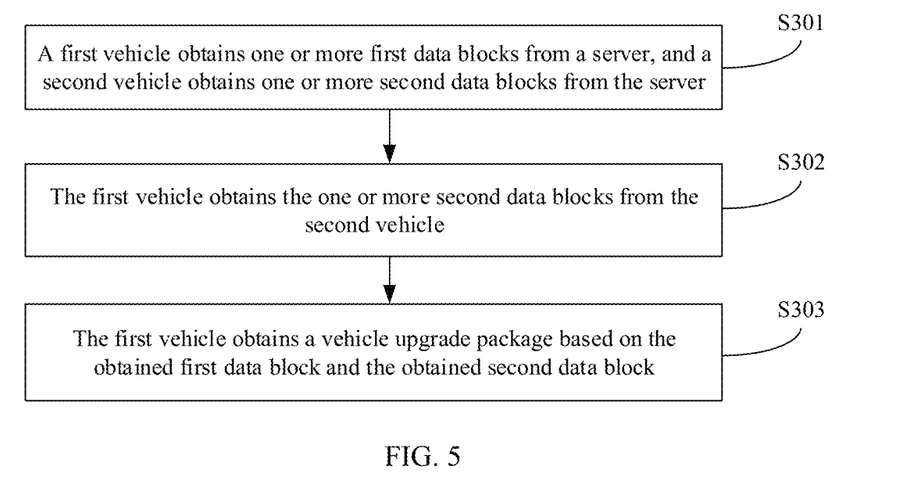
FIG. 5 is a schematic flowchart of a specific method for processing a vehicle upgrade package according to an embodiment of this application.

In some embodiments of this application, an example in which the first terminal is a first vehicle and the second terminal is a second vehicle is used. As shown in FIG. 5, optional specific implementation steps of the method for processing a vehicle upgrade package may be as follows:

Step S301: The first vehicle obtains one or more first data blocks from the server, and the second vehicle obtains one or more second data blocks from the server.

Step S302: The first vehicle obtains the one or more second data blocks from the second vehicle.

Step S303: The first vehicle obtains a vehicle upgrade package based on the obtained first data block and the obtained second data block.

In some embodiments of this application, for a method for dividing the vehicle upgrade package into blocks by the server and a method for obtaining the first data block and the second data block by the first vehicle, refer to the description in the embodiment corresponding to FIG. 2. Details are not described herein again.

In an optional application scenario in some embodiments of this application, as shown in FIG. 3, the server 30 is a vehicle fleet server, and the vehicle fleet server obtains, in advance from an OTA server, a vehicle upgrade package used by a vehicle fleet (for example, including a first vehicle 31, a second vehicle 320, a second vehicle 321, and a second vehicle 322) served by the vehicle fleet server. Further, during routine maintenance of the vehicle fleet, in a case of wireless fidelity (Wi-Fi) network connection or the like, the first vehicle 31, the second vehicle 320, the second vehicle 321, and the second vehicle 322 are connected to the vehicle fleet server. When receiving an upgrade package downloading notification, the vehicle fleet server performs bidirectional authentication (for example, a PKI-based authentication manner) with the first vehicle 31, the second vehicle 320, the second vehicle 321, and the second vehicle 322; and after succeeding in the authentication, encrypts an encryption key k of the upgrade package (encrypts the encryption key k of the upgrade package by using public keys of the vehicles), and then delivers encrypted encryption keys to the first vehicle 31, the second vehicle 320, the second vehicle 321, and the second vehicle 322. For example, if the first vehicle 31 downloads a first part of the vehicle upgrade package, the second vehicle 320 downloads a second part of the vehicle upgrade package, and the second vehicle 321 downloads a third part of the vehicle upgrade package, the first vehicle 31 may download the second part of the vehicle upgrade package from the second vehicle 320, download the third part of the vehicle upgrade package from the second vehicle 321, and further obtain the complete vehicle upgrade package through decryption by using the key k.

It can be understood that, the second vehicle 320 may also obtain the complete vehicle upgrade package from the first vehicle 31 and the second vehicle 321, and the second vehicle 321 may also obtain the complete vehicle upgrade package from the first vehicle 31 and the second vehicle 320.

In this case, after the first vehicle 31, the second vehicle 320, or the second vehicle 321 obtains the complete vehicle upgrade package, the second vehicle 322 can obtain the vehicle upgrade package from the first vehicle 31, the second vehicle 320, or the second vehicle 321. A specific process in which each vehicle downloads the vehicle upgrade package is not limited in this application.

In some embodiments of this application, the vehicle fleet server is used as a proxy server, so that the vehicle can implement convenient vehicle upgrading during maintenance or another process.

Optionally, to further improve stability of the vehicle upgrade package and prevent an incorrect vehicle upgrade package from being delivered to a plurality of vehicles, before step S301 is performed, performance test may be performed on a vehicle upgrade package. For example, a vehicle upgrade package may be first obtained from the server 30 by using a vehicle A, and then the vehicle A performs updating based on the vehicle upgrade package. If the updating succeeds, the vehicle A sends an update success message to the server 30; and then step S301 and subsequent steps are further performed. This can increase a probability of successful vehicle upgrading.

Figure 6:
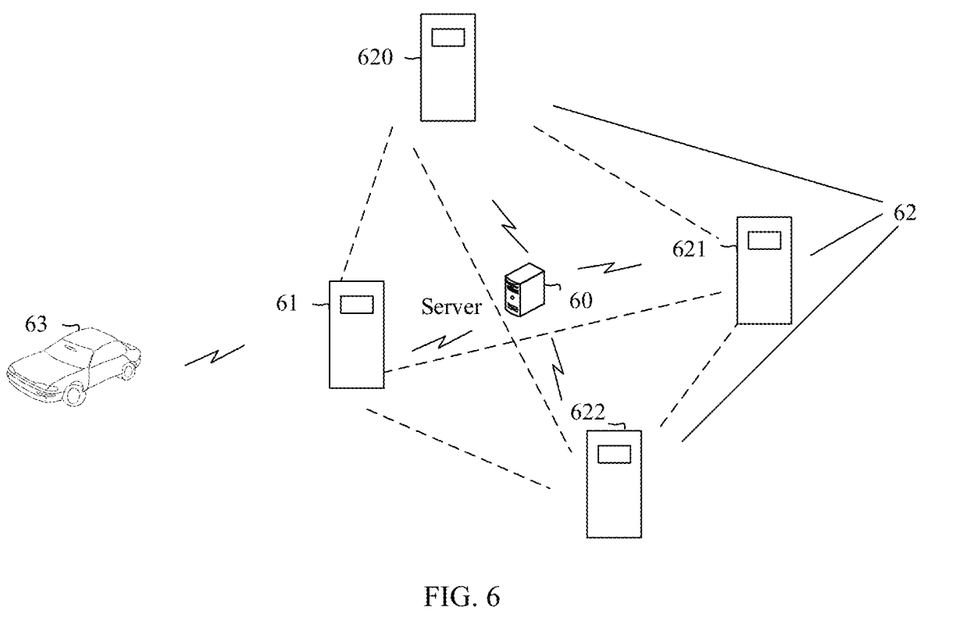
FIG. 6 is a schematic diagram of still another network system to which a method for processing a vehicle upgrade package is applied according to an embodiment of this application.

For example, FIG. 6 shows a specific upgrading system to which a method for processing a vehicle upgrade package may be applied according to an embodiment of this application. As shown in FIG. 6, the upgrading system includes a server 60, a first terminal 61, and a second terminal 62. There are three second terminals 62, which are respectively numbered as a second terminal 620, a second terminal 621, and a second terminal 622.

In some embodiments of this application, the server 60 may be an OTA server. The server 60 may alternatively be a proxy server. When the server 60 is a proxy server, the proxy server may first establish secure communication with an OTA server through bidirectional authentication, and then the proxy server sends, to the OTA server, hardware and software information of a vehicle served by a vehicle auxiliary device. After generating a vehicle upgrade package, the OTA server may deliver the vehicle upgrade package to the proxy server. It can be understood that, the OTA server may alternatively divide the vehicle upgrade package into blocks and deliver the blocks to a plurality of proxy servers; and the plurality of proxy servers obtain the vehicle upgrade package in the foregoing P2P manner. This is not specifically limited in this application.

Figure 7:
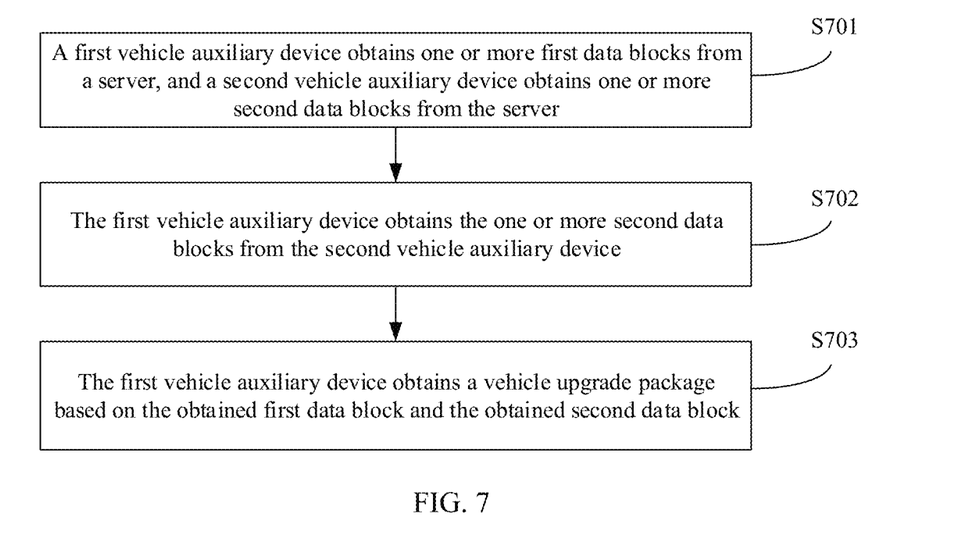
FIG. 7 is a schematic flowchart of another specific method for processing a vehicle upgrade package according to an embodiment of this application.

In some embodiments of this application, an example in which the first terminal is a first vehicle auxiliary device and the second terminal is a second vehicle auxiliary device is used. The second vehicle auxiliary device may be a device for vehicle charging (for example, a charging pile), a mobile terminal, or the like. As shown in FIG. 7, optional specific implementation steps of the method for processing a vehicle upgrade package may be as follows:

Step S701: The first vehicle auxiliary device obtains one or more first data blocks from the server, and the second vehicle auxiliary device obtains one or more second data blocks from the server.

Step S702: The first vehicle auxiliary device obtains the one or more second data blocks from the second vehicle auxiliary device.

Step S703: The first vehicle auxiliary device obtains a vehicle upgrade package based on the obtained first data block and the obtained second data block.

In some embodiments of this application, for a method for dividing the vehicle upgrade package into blocks by the server and a method for obtaining the first data block and the second data block by the first vehicle auxiliary device, refer to the description in the embodiment corresponding to FIG. 2. Details are not described herein again.

In an optional application scenario in some embodiments of this application, as shown in FIG. 6, the server 60 is an OTA server. The OTA server generates a vehicle upgrade package, and further notifies a first vehicle auxiliary device 61, a second vehicle auxiliary device 620, a second vehicle auxiliary device 621, and a second vehicle auxiliary device 622 that a vehicle upgrade package needs to be downloaded. The OTA server performs bidirectional authentication (for example, a PKI-based authentication manner) with the first vehicle auxiliary device 61, the second vehicle auxiliary device 620, the second vehicle auxiliary device 621, and the second vehicle auxiliary device 622; and after succeeding in the authentication, delivers, to the first vehicle auxiliary device 61, the second vehicle auxiliary device 620, the second vehicle auxiliary device 621, and the second vehicle auxiliary device 622, data blocks encrypted by using a key k. For example, if the first vehicle auxiliary device 61 downloads a first part of the vehicle upgrade package, the second vehicle auxiliary device 620 downloads a second part of the vehicle upgrade package, and the second vehicle auxiliary device 621 downloads a third part of the vehicle upgrade package, the first vehicle auxiliary device 61 may download the second part of the vehicle upgrade package from the second vehicle auxiliary device 620, download the third part of the vehicle upgrade package from the second vehicle auxiliary device 621, and further obtain the complete vehicle upgrade package through decryption by using the key k.

It can be understood that, the second vehicle auxiliary device 620 may also obtain the complete vehicle upgrade package from the first vehicle auxiliary device 61 and the second vehicle auxiliary device 621, and the second vehicle auxiliary device 621 may also obtain the complete vehicle upgrade package from the first vehicle auxiliary device 61 and the second vehicle auxiliary device 620.

In this case, after the first vehicle auxiliary device 61, the second vehicle auxiliary device 620, or the second vehicle auxiliary device 621 obtains the complete vehicle upgrade package, the second vehicle auxiliary device 622 can obtain the vehicle upgrade package from the first vehicle auxiliary device 61, the second vehicle auxiliary device 620, or the second vehicle auxiliary device 621. A specific process in which each vehicle auxiliary device downloads the vehicle upgrade package is not limited in this application.

In some embodiments of this application, for example, after receiving an upgrade notification, a vehicle 63 may establish a connection to the OTA server to obtain the encryption key k of the vehicle upgrade package. When the vehicle 63 is being charged by using the first vehicle auxiliary device 61, the second vehicle auxiliary device 620, the second vehicle auxiliary device 621, or the second vehicle auxiliary device 622, the first vehicle auxiliary device 61, the second vehicle auxiliary device 620, the second vehicle auxiliary device 621, or the second vehicle auxiliary device 622 may receive an upgrade package obtaining request sent by the vehicle, and perform bidirectional authentication with the vehicle. Then, the first vehicle auxiliary device 61, the second vehicle auxiliary device 620, the second vehicle auxiliary device 621, or the second vehicle auxiliary device 622 may send the encrypted vehicle upgrade package to the vehicle. The vehicle 63 decrypts the encrypted vehicle upgrade package by using the key k to obtain the vehicle upgrade package. In this way, the vehicle 63 can download the vehicle upgrade package while being charged. It can be understood that, during charging of the vehicle, there may usually be a relatively good network environment because the vehicle is usually in a stationary state; and incidents such as download interruption of the vehicle upgrade package due to insufficient power of the vehicle can be avoided because the vehicle is connected to a charging auxiliary device. Therefore, user experience of vehicle upgrading can be effectively improved.

Optionally, to further improve stability of the vehicle upgrade package and prevent an incorrect vehicle upgrade package from being delivered to a plurality of vehicles, before step S701 is performed, correctness test may be performed on a vehicle upgrade package. For example, a vehicle upgrade package may be first obtained from the first vehicle auxiliary device 61, the second vehicle auxiliary device 620, the second vehicle auxiliary device 621, or the second vehicle auxiliary device 622 by using a vehicle A, and then the vehicle A performs updating based on the vehicle upgrade package. If the updating succeeds, the vehicle A sends an update success message to the first vehicle auxiliary device 61, the second vehicle auxiliary device 620, the second vehicle auxiliary device 621, or the second vehicle auxiliary device 622, and then step S701 and subsequent steps are further performed. This can increase a probability of successfully upgrading an in-vehicle system.

Figure 8:
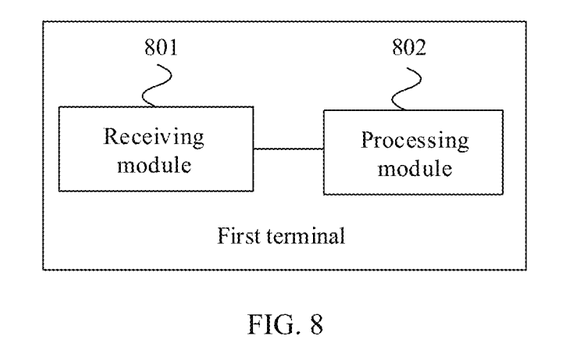
FIG. 8 is a schematic diagram of a structure of a first terminal according to an embodiment of this application.

FIG. 8 is a schematic diagram of a structure of a first terminal according to an embodiment of this application. The first terminal includes a receiving module 801 and a processing module 802. The receiving module is configured to receive one or more first data blocks from a server, where the first data block is used for vehicle upgrading. The processing module is configured to: obtain, by the first terminal, one or more second data blocks from a second terminal, where the second data block is used for upgrading an in-vehicle system, and the second data block is sent by the server to the second terminal; and obtain a vehicle upgrade package based on the first data block and the second data block.

In a possible design, both the first data block and the second data block are encrypted data blocks, and the data block length of the first data block and the data block length of the at least one second data block each are an integer multiple of the packet length of an encryption algorithm.

In a possible design, the processing module is configured to: start to decrypt the first data block at a first time and receive the second data block at a second time, where the first time is earlier than the second time; or start to decrypt the second data block at a third time and receive the first data block at a fourth time, where the third time is earlier than the fourth time.

In a possible design, the first data block and the second data block each include a signature of a server that generates an upgrade package for upgrading a vehicle system; and the processing module is further configured to: start to decrypt the first data block at the first time when confirming that a signature in the first data block is the signature of the server that generates an upgrade package for upgrading a vehicle system; and start to decrypt the second data block at the third time when confirming that a signature in the second data block is the signature of the server that generates an upgrade package for upgrading a vehicle system.

In a possible design, the server stores an association relationship between each data block obtained through division of the vehicle upgrade package and the terminal that receives the data block; and the processing module is further configured to: send a data block obtaining request to the second terminal based on the association relationship; and receive one or more second data blocks returned by the second terminal in response to the data block obtaining request.

In a possible design, the server is a proxy server, the vehicle upgrade package is obtained by the proxy server from an over the air (OTA) server, and the first terminal is a vehicle.

In a possible design, the first terminal is a charging pile.

In a possible design, the receiving module is further configured to receive an upgrade package obtaining request sent by a vehicle; and the processing module is further configured to: when the vehicle succeeds in safety verification of the charging pile, return the vehicle upgrade package to the vehicle based on the upgrade package obtaining request.

In a possible design, the receiving module is configured to receive, by the first terminal, the first data block from the server when the first terminal succeeds in security authentication with the server.

The apparatus in this embodiment may be correspondingly configured to perform the steps performed by the first terminal in the foregoing method embodiment. An implementation principle and technical effects of the apparatus are similar to those of the foregoing method, and details are not described herein again.

Figure 9:
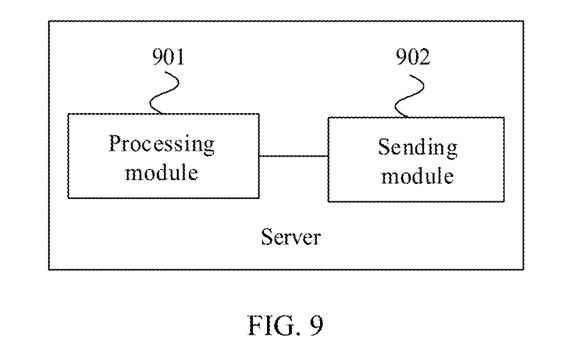
FIG. 9 is a schematic diagram of a structure of a server according to an embodiment of this application.

FIG. 9 is a schematic diagram of a structure of a first terminal according to an embodiment of this application. The first terminal includes a processing module 901 and a sending module 902. The processing module is configured to divide a vehicle upgrade package into a plurality of data blocks. The sending module is configured to distribute the plurality of data blocks to at least one terminal, where each terminal is configured to obtain the vehicle upgrade package based on a data block received by the terminal and a data block from another terminal in the at least one terminal.

In a possible design, the processing module is configured to: encrypt the vehicle upgrade package according to an encryption algorithm, and divide the encrypted vehicle upgrade package into the plurality of data blocks.

In a possible design, the server is a proxy server; and the processing module is further configured to obtain the vehicle upgrade package from an over the air (OTA) server.

In a possible design, the processing module is configured to: send a vehicle upgrade package obtaining request to the over the air (OTA) server, where the vehicle upgrade package obtaining request includes an operating system type and a version of a vehicle; and when the proxy server succeeds in security verification with the OTA server, receive the vehicle upgrade package sent by the OTA server, where the vehicle upgrade package is generated by the OTA server based on the operating system type and the version of the vehicle.

In a possible design, the processing module is further configured to record an association relationship between each data block obtained through division of the vehicle upgrade package and the terminal that receives the data block.

The apparatus in this embodiment may be correspondingly configured to perform the steps performed by the server in the foregoing method embodiment. An implementation principle and technical effects of the apparatus are similar to those of the foregoing method, and details are not described herein again.

Figure 10:
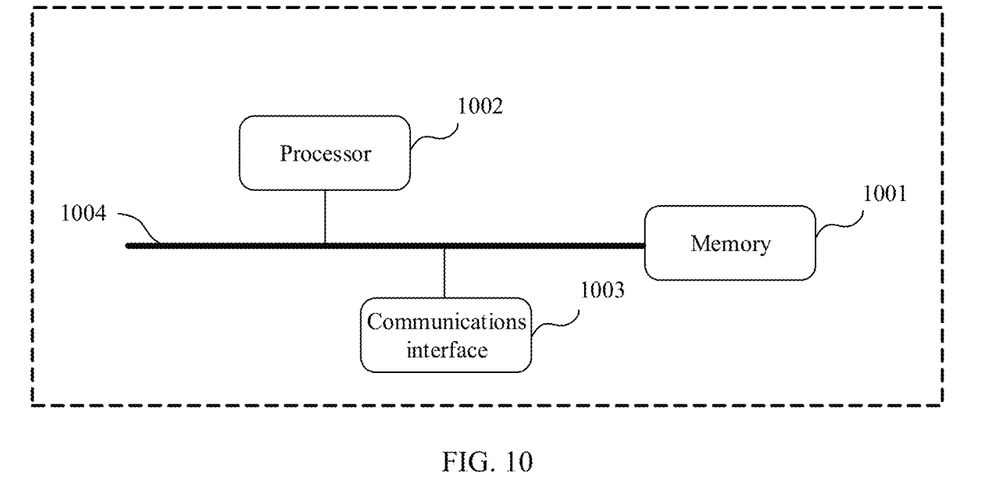
FIG. 10 is a schematic diagram of a hardware structure of an apparatus for processing a vehicle upgrade package according to an embodiment of this application.

FIG. 10 is a schematic diagram of a hardware structure of an apparatus for processing a vehicle upgrade package according to this application. Refer to FIG. 10. The apparatus for processing a vehicle upgrade package includes a memory 1001, a processor 1002, and a communications interface 1003. The memory 1001, the processor 1002, and the communications interface 1003 may communicate with each other. For example, the memory 1001, the processor 1002, and the communications interface 1003 may communicate with each other by using a communications bus 1004. The memory 1001 is configured to store a computer program. The processor 1002 executes the computer program to implement the methods described in the foregoing method embodiments.

Optionally, the communications interface 1003 may further include a transmitter and/or a receiver.

Optionally, the processor may be a central processing unit (CPU), or may be another general-purpose processor, a digital signal processor (DSP), an application-specific integrated circuit (ASIC), or the like. The general-purpose processor may be a microprocessor, or the processor may be any conventional processor or the like. The steps of the methods disclosed with reference to this application may be directly implemented by a hardware processor, or may be implemented by a combination of hardware and a software module in a processor.

This application provides a computer-readable storage medium. The computer-readable storage medium is configured to store a computer program, and the computer program is used to implement the methods described in the foregoing method embodiments.

This application further provides a communications system, including the first terminal shown in FIG. 8 and the server shown in FIG. 9.

This application provides a system chip. The system chip is configured to support a communications apparatus in implementing functions described in embodiments of this application (for example, a first terminal receives one or more first data blocks from a server, where the first data block is used for vehicle upgrading; the first terminal obtains one or more second data blocks from a second terminal, where the second data block is used for upgrading an in-vehicle system, and the second data block is sent by the server to the second terminal; and the first terminal obtains a vehicle upgrade package based on the first data block and the second data block). The chip is specifically used in a chip system, and the chip system may include a chip, or may include a chip and another discrete device. When the foregoing method is implemented by using a chip in a first device, the chip includes a processing unit. Further, the chip may further include a communications unit. The processing unit may be, for example, a processor. When the chip includes the communications unit, the communications unit may be, for example, an input/output interface, a pin, or a circuit. The processing unit performs all or some operations performed by each processing module in embodiments of this application, and the communications unit may perform a corresponding receiving or sending operation. In another specific embodiment, a processing module of a receiving device in this application may be the processing unit of the chip, and a receiving module or a sending module of a control device is the communications unit of the chip.

Embodiments of this application are described with reference to the flowcharts and/or block diagrams of the method, the device (system), and the computer program product according to embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processing unit of any other programmable data processing device to generate a machine, so that instructions executed by the computer or the processing unit of any other programmable data processing device generate an apparatus for implementing a specific function in one or more processes in the flowcharts and/or in one or more blocks in the block diagrams.

These computer program instructions may also be stored in a computer-readable memory that can indicate the computer or the other programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may be loaded onto the computer or the other programmable data processing device, so that a series of operations and steps are performed on the computer or the other programmable device, thereby generating computer-implemented processing. Therefore, the instructions executed on the computer or the other programmable device provide steps for implementing a specific function in one or more procedures in the flowcharts and/or in one or more blocks in the block diagrams.

In the several embodiments provided in this application, it should be understood that the disclosed apparatus and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of hardware plus a software function unit.

When the foregoing integrated unit is implemented in a form of a software function unit, the integrated unit may be stored in a computer-readable storage medium. The software function unit is stored in a storage medium and includes several instructions for instructing a computer device (which may be a personal computer, a server, or a network device) or a processor to perform a part of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A first apparatus, comprising a processor and a memory, wherein the memory is configured to store program instructions, and the processor is coupled to the memory to execute the instructions to:

receive a first data block from a server, wherein the first data block is used for upgrading a vehicle;

obtain a second data block from a terminal based on an association relationship, wherein the second data block is used for upgrading the vehicle, and the second data block is sent by the server to the terminal; and obtain a vehicle upgrade package based on the first data block and the second data block; wherein the first data block and the second data block each are a part of the vehicle upgrade package, wherein the first data block and the second data block are obtained by the server by dividing the vehicle upgrade package, and wherein the association relationship is a relationship between each data block of the vehicle upgrade package and a terminal that receives the data block;

wherein the obtaining of the second data block from the terminal based on the association relationship comprises:

sending a data block obtaining request to the terminal based on the association relationship between each data block obtained through division of the vehicle upgrade package and a terminal that receives the data block; and receiving the second data block returned by the terminal in response to the data block obtaining request.

2. The apparatus according to claim 1, wherein both the first data block and the second data block are encrypted data blocks, and a length of the first data block and a length of the second data block each is an integer multiple of a packet length of an encryption algorithm.

3. The apparatus according to claim 2, wherein the processor is coupled to the memory to further execute the instructions to:

start decrypting the first data block at a first time, and receive the second data block at a second time, wherein the first time is earlier than the second time.

4. The apparatus according to claim 2, wherein the processor is coupled to the memory to further execute the instructions to:

start decrypting the second data block at a third time, and receive the first data block at a fourth time, wherein the third time is earlier than the fourth time.

5. The apparatus according to claim 1, wherein the server is a proxy server, the vehicle upgrade package is obtained by the proxy server from an over the air (OTA) server, and the first apparatus is a vehicle.

6. The apparatus according to claim 1, wherein the first apparatus is a charging pile.

7. The apparatus according to claim 6, wherein the processor is coupled to the memory to further execute the instructions to:

receive, an upgrade package obtaining request sent by a vehicle; and when the vehicle passes safety verification of the charging pile, return the vehicle upgrade package to the vehicle based on the upgrade package obtaining request.

8. The apparatus according to claim 1, wherein the processor is coupled to the memory to further execute the instructions to:

receive the first data block from the server when the first apparatus succeeds in security authentication with the server.

9. A server, comprising a processor and a memory, wherein the memory is configured to store program instructions, and the processor is coupled to the memory to execute the program instructions to:

divide a vehicle upgrade package into a plurality of data blocks;

generate an association relationship for each of the plurality of data blocks, wherein the association relationship is a relationship between each data block of the plurality of data blocks and a terminal that receives the data block;

distribute the plurality of data blocks to a plurality of terminals, wherein the plurality of data blocks are configured to be combined into the vehicle upgrade package by a first terminal, and the first terminal is one of the plurality of terminals that receives multiple data blocks of the plurality of data blocks from other terminals among the plurality of terminals;

send a data block obtaining request to a second terminal based on the association relationship between each data block obtained through division of the vehicle upgrade package and a terminal that receives the data block; and receive a second data block returned by the second terminal in response to the data block obtaining request; wherein the second data block is used for upgrading the vehicle, and the second data block is sent by the server to the second terminal.

10. The server according to claim 9, wherein the processor is coupled to the memory to further execute the instructions to:

encrypt the vehicle upgrade package according to an encryption algorithm, and divide the encrypted vehicle upgrade package into the plurality of data blocks.

11. The server according to claim 9, wherein the server is a proxy server; and the processor is coupled to the memory to further execute the instructions to:

obtain the vehicle upgrade package from an over the air (OTA) server.

12. The server according to claim 11, wherein the processor is coupled to the memory to further execute the instructions to:

send a vehicle upgrade package obtaining request to the over the air (OTA) server, wherein the vehicle upgrade package obtaining request comprises an operating system type of a vehicle and a version of the vehicle; and when the proxy server succeeds in security verification with the (OTA) server, receive, the vehicle upgrade package sent by the (OTA) server, wherein the vehicle upgrade package is generated by the (OTA) server based on the operating system type of the vehicle and the version of the vehicle.

13. A method for processing a vehicle upgrade package for a vehicle, comprising:

receiving, by a first terminal, a first data block from a server, wherein the first data block is used for upgrading the vehicle;

obtaining, by the first terminal, a second data block from a second terminal, wherein the second data block is used for upgrading the vehicle, and the second data block is sent by the server to the second terminal; and obtaining, by the first terminal, the vehicle upgrade package based on the first data block and the second data block;

wherein the first data block and the second data block each are a part of the vehicle upgrade package, wherein the first data block and the second data block are obtained by the server by dividing the vehicle upgrade package, and wherein the association relationship is a relationship between each data block of the vehicle upgrade package and a terminal that receives the data block;

wherein the obtaining, by the first terminal, the second data block from the second terminal comprises:

sending, by the first terminal, a data block obtaining request to the second terminal based on an association relationship between each data block obtained through division of the vehicle upgrade package and a terminal that receives the data block; and receiving, by the first terminal, the second data block returned by the second terminal in response to the data block obtaining request.

14. The method according to claim 13, wherein both the first data block and the second data block are encrypted data blocks, and a length of the first data block and a length of the second data block each is an integer multiple of a packet length of an encryption algorithm.

15. The method according to claim 13, wherein the server is a proxy server, the vehicle upgrade package is obtained by the proxy server from an over the air (OTA) server, and the first terminal is a vehicle.

16. The method according to claim 13, wherein the first terminal is a charging pile.

17. The method according to claim 16, wherein the method further comprises:

receiving, by the charging pile, an upgrade package obtaining request sent by a vehicle; and when the vehicle passes safety verification of the charging pile, returning, by the charging pile, the vehicle upgrade package to the vehicle based on the upgrade package obtaining request.

* * * * *